No. 772,949. PATENTED OCT. 25, 1904.
C. W. MEYER.
THROTTLE AND STEERING LEVER FOR AUTOMOBILES.
APPLICATION FILED FEB. 29, 1904.
NO MODEL.

WITNESSES:
C. N. Walker
L. C. Mudd

INVENTOR
C. W. Meyer
By Swift & Co.
Attorneys

No. 772,949.   Patented October 25, 1904.

UNITED STATES PATENT OFFICE.

CHARLES W. MEYER, OF ODEBOLT, IOWA.

THROTTLE AND STEERING LEVER FOR AUTOMOBILES.

SPECIFICATION forming part of Letters Patent No. 772,949, dated October 25, 1904.

Application filed February 29, 1904. Serial No. 195,795. (No model.)

*To all whom it may concern:*

Be it known that I, CHARLES W. MEYER, a citizen of the United States, residing at Odebolt, in the county of Sac and State of Iowa, have invented a new and useful Throttle and Steering Lever for Automobiles; and I do hereby declare the following to be a full, clear, and exact description of the invention, such as will enable others skilled in the art to which it appertains to make and use the same.

The invention relates to a throttle and steering lever for automobiles; and it has for its object to combine the throttle and steering lever and to provide a simple, inexpensive, and efficient device which will enable an automobile to be steered and the motor controlled with one hand, thereby greatly facilitating the operation of automobiles.

With these and other objects in view the invention consists in the construction and novel arrangement of parts hereinafter described and shown, and particularly pointed out in the appended claims.

Figure 1:
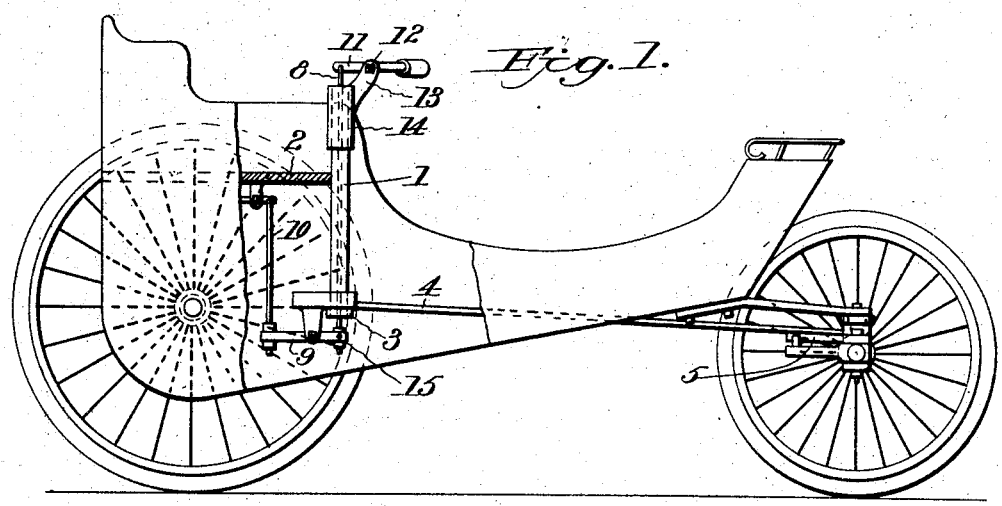
Figure 2:
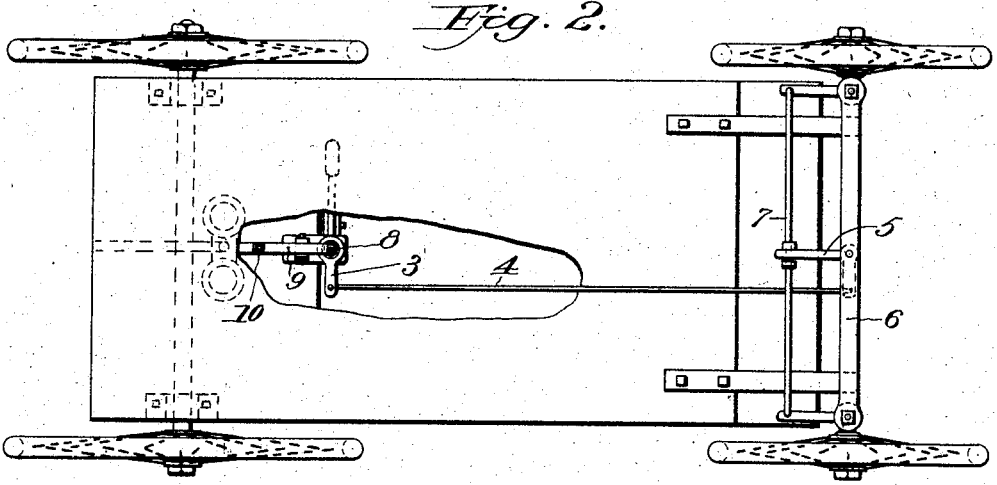
Figure 3:
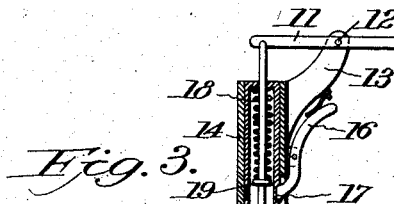

In the drawings forming part of this specification, and in which like numerals of reference designate corresponding parts, Figure 1 is a side elevation, partly in section, of an automobile provided with a combined throttle and steering lever constructed in accordance with this invention. Fig. 2 is a reverse plan view of the same. Fig. 3 is an enlarged detail sectional view illustrating the manner of mounting the combined steering and throttle lever.

Referring to the drawings, 1 designates a hollow vertical shaft journaled in suitable bearings contiguous to the seat 2 of the body of an automobile and provided at its lower end with an arm 3, which is connected by a rod 4 with a bell-crank lever 5, and the latter is fulcrumed at its angle on the front axle 6 or other suitable portions of the running-gear of the automobile. One arm of the bell-crank lever is pivoted to the front end of the connecting-rod 4, and its other arm is similarly connected to a transverse connecting-rod 7. The transverse rod 7 is connected with the front wheels in the ordinary manner and when shifted is adapted to turn the spindles on which the front wheels are mounted. The spindles of the front axle are designed to be pivotally mounted in the ordinary manner and are provided with arms for connections with the ends of the transverse rod 7. By this construction the lower end of the hollow shaft is connected with the front wheels; but any other suitable means may be provided for this purpose, as will be readily understood. Within the hollow shaft is arranged a vertically-reciprocating rod 8, which is connected by a lever 9 with a throttle-rod 10, and the latter may be connected with the motor in any well-known manner, whereby when the vertically-reciprocating rod is moved vertically the motor will be operated to start, stop, or back the automobile. The vertically-reciprocating rod is connected at its upper end with an approximately-horizontal lever 11, fulcrumed between its ends at 12 on a supporting-arm 13 of a cylindrical cap 14, which is swiveled to the upper end of the hollow shaft and which is capable of rotation thereon to enable the lever to be arranged in advance or in rear of the hollow shaft to suit the convenience of the operator. A suitable swivel-joint 15 is provided at the lower end of the vertically-reciprocating rod to permit the same to rotate with the lever. The reversible rotary support formed by the cap 14 is locked in either position by a catch 16, consisting of a spring-actuated lever mounted on the support and provided with an engaging portion 17, extending through the cap and adapted to engage a recess at the front and back of the hollow shaft. The spring-actuated lever is fulcrumed between its ends, as shown, a spring being interposed between the upper arm of the lever and the support. By this construction the support is rigidly secured to the hollow shaft in either of its positions. A coiled spring 18, which is disposed on the rod, engages a pin 19 of the same and the upper end of the cap to counterbalance the weight of the lever and the hand of the operator to facilitate the operation of the combined throttle and steering lever.

The combined steering and throttle lever is brought to an intermediate position to stop the automobile and is raised from such position to back the machine and is depressed or moved downward from the intermediate position to cause the machine to move forward. By combining the steering and motor-controlling means in a single device the automobile may be controlled with one hand, thereby leaving the other hand of the operator free, and both hands may be conveniently arranged beneath a lap-robe or other covering when desired.

What I claim is—

1. A device of the class described, comprising a hollow shaft designed to be connected with steering mechanism, a rod operating in the shaft for connection with a motor, an adjustable support mounted on the shaft and provided with means for engaging the same, and a lever fulcrumed on the support and connected with the rod, substantially as described.

2. A device of the class described, comprising a hollow shaft, a rod reciprocating in the shaft, a reversible cap mounted on the shaft and provided with a catch for engaging the same, a lever mounted on the cap and connected with the rod, and a spring connected with the rod for counterbalancing the rod, substantially as described.

In testimony whereof I have hereto affixed my signature in the presence of two witnesses.

CHARLES W. MEYER.

Witnesses:
HENRY MEYER,
A. E. BAKER.